(12) United States Patent
Yoshida et al.

(10) Patent No.: US 10,892,670 B2
(45) Date of Patent: Jan. 12, 2021

(54) METHOD FOR BONDING ELECTRICAL CONDUCTORS

(71) Applicant: HONDA MOTOR CO., LTD., Tokyo (JP)

(72) Inventors: Kotaro Yoshida, Tochigi (JP); Satonori Iura, Tochigi (JP); Toru Eguchi, Tochigi (JP); Kazuhide Matsuo, Tochigi (JP); Takeshi Ueda, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 486 days.

(21) Appl. No.: 15/920,712

(22) Filed: Mar. 14, 2018

(65) Prior Publication Data
US 2018/0269755 A1 Sep. 20, 2018

(30) Foreign Application Priority Data
Mar. 15, 2017 (JP) .................. 2017-049606

(51) Int. Cl.
| | | |
|---|---|---|
| H02K 15/00 | (2006.01) | |
| H02K 1/16 | (2006.01) | |
| H02K 3/12 | (2006.01) | |
| H02K 3/50 | (2006.01) | |
| B23K 11/11 | (2006.01) | |

(Continued)

(52) U.S. Cl.
CPC ....... *H02K 15/0068* (2013.01); *B23K 1/0004* (2013.01); *B23K 1/0016* (2013.01); *B23K 1/19* (2013.01); *B23K 11/11* (2013.01); *B23K 11/115* (2013.01); *B23K 11/18* (2013.01); *B23K 11/34* (2013.01); *B23K 35/025* (2013.01); *B23K 35/3006* (2013.01); *H02K 1/16* (2013.01); *H02K 3/12* (2013.01); *H02K 3/50* (2013.01); *H02K 15/024* (2013.01); *H02K 15/04* (2013.01); *H02K 15/085* (2013.01); *B23K 2101/36* (2018.08); *B23K 2101/38* (2018.08); *B23K 2103/12* (2018.08)

(58) Field of Classification Search
CPC .. H02K 15/0068; H02K 15/024; H02K 15/04; H02K 15/085; B23K 1/0004; B23K 1/0016; B23K 1/19; B23K 11/11; B23K 11/115; B23K 11/18; B23K 11/34; B23K 35/025; B23K 35/3006
USPC ................................................ 29/596, 592.1
See application file for complete search history.

(56) References Cited

U.S. PATENT DOCUMENTS 7,788,791 B2 * 9/2010 Hara .................. H02K 15/0081
29/596

FOREIGN PATENT DOCUMENTS

JP 2016-013021 1/2016

* cited by examiner

*Primary Examiner* — Peter Dungba Vo
*Assistant Examiner* — Azm A Parvez
(74) *Attorney, Agent, or Firm* — Rankin, Hill & Clark LLP

(57) ABSTRACT

A method for bonding electrical conductors is provided that is capable of suppressing a power source capacity when assembling a stator having a specific structure. First, coil pieces 9 are arranged in contact with bonding portions of a slot coil 5 inserted in a slot of a stator iron core 2 via a metal paste. Subsequently, an electrical current is applied using a pair of electrodes 11A and 11B in the axial direction (upward and downward in the figures) of the slot coil 5 while contact portions 15 between the slot coil 5 and the coil pieces 9 are pressed in an axial direction of the slot coil 5. As a result, electricity flows in the axial direction the coil piece 9 (a direction of an arrow X in the figures).

5 Claims, 3 Drawing Sheets

(51) Int. Cl.
  *H02K 15/085* (2006.01)
  *B23K 35/02* (2006.01)
  *B23K 35/30* (2006.01)
  *H02K 15/02* (2006.01)
  *B23K 11/18* (2006.01)
  *B23K 1/19* (2006.01)
  *B23K 11/34* (2006.01)
  *B23K 1/00* (2006.01)
  *H02K 15/04* (2006.01)
  *B23K 101/36* (2006.01)
  *B23K 103/12* (2006.01)
  *B23K 101/38* (2006.01)

METHOD FOR BONDING ELECTRICAL CONDUCTORS

This application is based on and claims the benefit of priority from Japanese Patent Application No. 2017-049606, filed on 15 Mar. 2017, the content of which is incorporated herein by reference.

BACKGROUND OF THE INVENTION

Field of the Invention

The present invention relates to a method for bonding electrical conductors suitable for application when mass-producing stators of motors mounted on, for example, electric vehicles, hybrid vehicles, and the like.

Related Art

Conventionally, a stator of this type has been proposed in which a plurality of slots are formed at predetermined intervals in an annular stator iron core along a circumferential direction of the core, linear (I-shaped) slot coils are inserted into the slots respectively so that bonding portions on both axial sides thereof protrude from the slots, and the slot coils inserted in different slots out of the plurality of slots are sequentially bonded with coil pieced, whereby the slot coils and the coil pieces are electrically connected to each other to form a coil (for example, see Patent Document 1).

When assembling such a stator, it is necessary to bond the slot coils and the coil pieces. As this bonding method, a method can be considered in which all the slot coils and all the coil pieces are alternately connected in series and a pair of electrodes are connected and apply an electric current to both ends thereof, whereby all the connection points are collectively and efficiently bonded.

Patent Document 1: Japanese Unexamined Patent Application, Publication No. 2016-13021

SUMMARY OF THE INVENTION

However, in this bonding method, an electricity flows through all the conductive members (slot coils and coil pieces) when the electricity is applied between a pair of electrodes, so a power source capacity must be increased.

In view of such circumstances, the present invention intends to provide a method for bonding electrical conductors capable of suppressing a power source capacity when assembling a stator having a specific structure.

A method for bonding electrical conductors according to the present invention is a method for bonding electrical conductors that bonds conductor members and connection conductor members in a stator (for example, a stator 1 to be described) where a plurality of slots (for example, slots 3 to be described later) are formed in an annular stator iron core (for example, a stator iron core 2 to be described later) along a circumferential direction thereof, linear conductor members (for example, slot coils 5 to be described later) are inserted into the slots respectively such that bonding portions (for example, bonding portions 5a and 5b to be described later) of each of the conductor members on both sides in an axial direction thereof protrude from the slot, and the conductor members inserted in different slots of the plurality of slots are sequentially bonded with the connection conductor members (for example, coil pieces 9 to described later) so that the conductor members and the connection conductor members are connected to electrically to form a coil. The method includes: an arrangement process of arranging the connection conductor members in contact with the bonding portions of the conductor member via a metal paste (for example, a metal paste 10 to be described); and a current application process of applying an electrical current in the axial direction of the conductor members with the use of a pair of electrodes (for example, electrodes 11A and 11B to be described) while pressing contact portions (for example, contact portions 15 to be described) between the conductor member and the connection conductor members in the axial direction of the conductor member.

In the arrangement process, the connection conductor members may be placed in contact with the bonding portions on both sides in the axial direction of the conductor member via the metal paste, respectively, and in the current application process, the electrical current may be applied between the pair of electrodes in the axial direction of the conductor member while the contact portions between the conductor member and the connection conductor members are pressed by the electrodes in the axial direction of the conductor member.

In the arrangement process, a first connection conductor member may be arranged in contact with an arbitrary first conductor member of the conductor members via the metal paste at a bonding portion of the first conductor member on one side in an axial direction thereof while arranging a second connection conductor member in contact with the first conductor member via the metal paste at a bonding portion of the first conductor member on the other side in the axial direction thereof, a third connection conductor member may be arranged in contact with an arbitrary second conductor member, which is different from the first conductor member, of the conductor members via the metal paste at a bonding portion of the second conductor member on one side in an axial direction thereof while arranging a fourth connection conductor member in contact with the second conductor member via the metal paste at a bonding portion of the second conductor member on the other side in the axial direction thereof, and the bonding portion of the second connection conductor member and the bonding portion of the fourth connection conductor member may be electrically connected to each other via a relay electrode (for example, a relay electrode 16 in the drawing). In the current application process, the electrical current may be applied between the pair of electrodes while contact portions between the first conductor member and the first connection conductor member and the second connection conductor member are pressed by one of the pair of electrodes and the relay electrode in the axial direction of the first conductor member and a contact portion between the second conductor member and the third connection conductor member and the fourth connection conductor member is pressed by the other of the pair of electrodes and the relay electrode in the axial direction of the second conductor member.

A cross-sectional area of a portion of the conductor member facing the contact portion may be smaller than a cross-sectional area of a portion of the conductor member not facing the contact portion.

A cross-sectional area of a portion of the connection conductor member facing the contact portion may be smaller than a cross-sectional area of a portion of the connection conductor member not facing the contact portion.

The metal paste may be Ag nano paste.

According to the present invention, it is possible to provide a method for bonding electrical conductors capable of suppressing a power source capacity when assembling a stator having a specific structure.

DETAILED DESCRIPTION OF THE INVENTION

Hereinafter, a first embodiment of the present invention will be described with reference to the drawings.

First Embodiment

Figure 1:
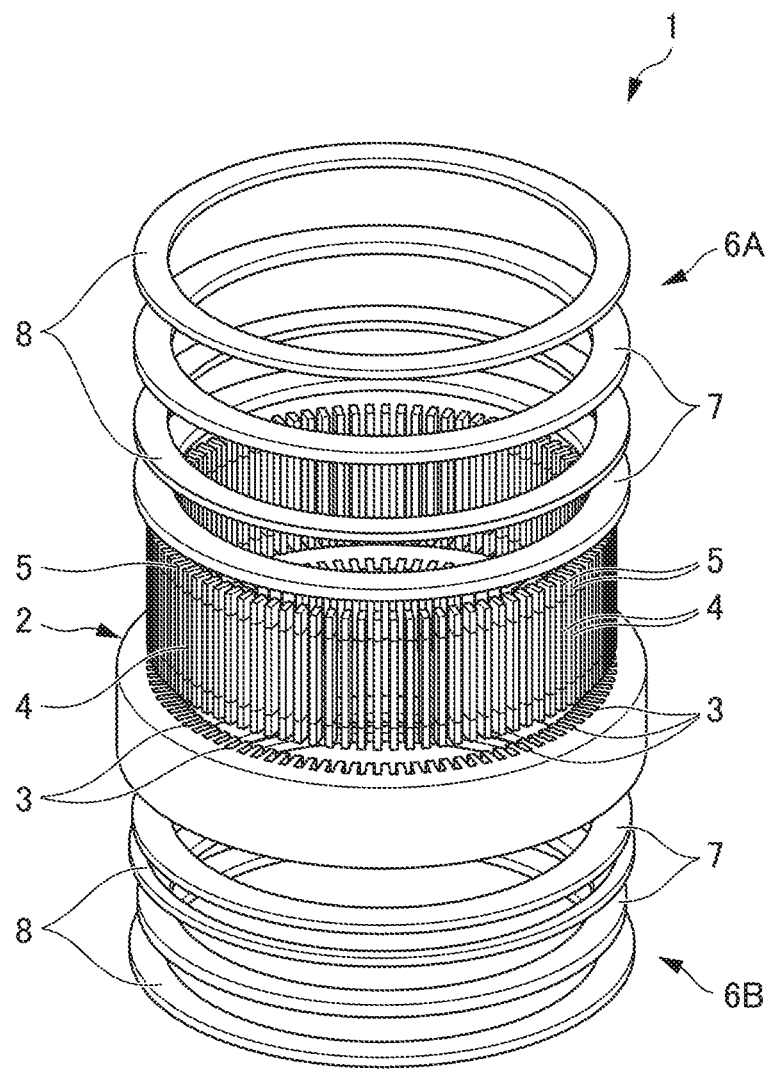
FIG. 1 is an exploded perspective view illustrating a schematic configuration of a stator according to a first embodiment of the present invention.
Figure 2A:
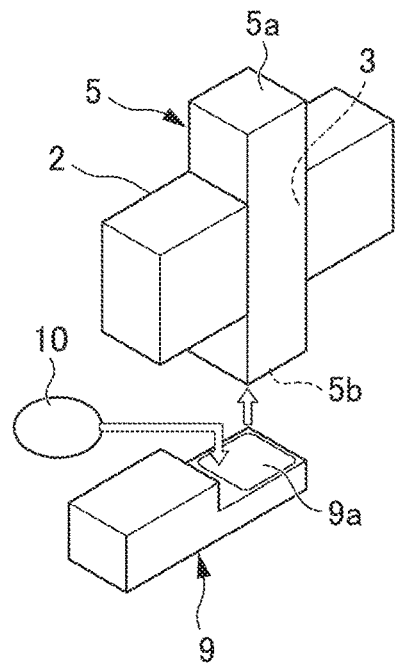
FIG. 2A is a schematic perspective view illustrating an arrangement process in a method for bonding electrical conductors according to a first embodiment of the present invention.
Figure 2B:
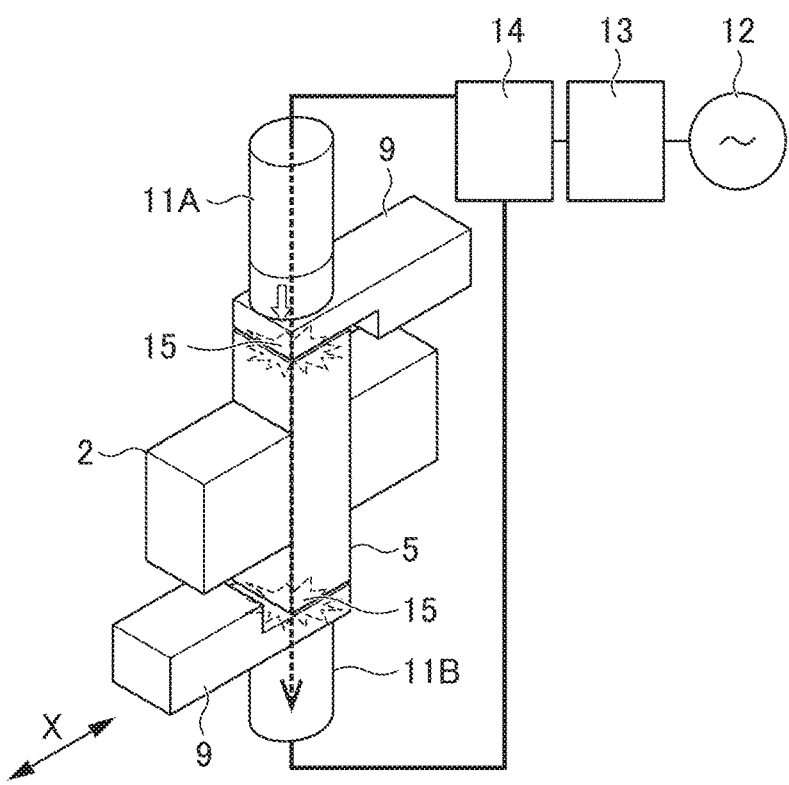
FIG. 2B is a schematic perspective view illustrating a current application process in a method for bonding electrical conductors according to the first embodiment of the present invention.

FIG. 1 is a schematic perspective view illustrating an arrangement process in a method for bonding electrical conductors according to a first embodiment of the present invention. FIGS. 2A and 2B are schematic perspective views showing an arrangement process and a current application process in the method for bonding electrical conductors according to the first embodiment of the present invention, respectively.

A stator 1 according to the first embodiment is used as a component of a motor mounted on an electric vehicle, a hybrid car, or the like. As illustrated in FIG. 1, the stator 1 includes an annular stator iron core (a stator core) 2. In the stator iron core 2, a plurality (for example, 50 to 200) of the slots 3 are formed at equiangular intervals along a circumferential direction of the stator iron core 2. Copper slot coils 5 as linear (I-shaped) conductor members are inserted in the slots 3 respectively so that bonding portions 5a and 5b of the coil 5 on both sides in an axial direction (upward and downward in FIG. 1) thereof protrude from the slot 3. Further, each of the slot coils 5 is covered with a resin insulating material 4.

Further, base plates 6A and 6B are arranged on both sides of in the axial direction (upward and downward in FIG. 1) of the stator iron core 2, respectively. Each of the base plates 6A and 6B is configured by alternately laminating two annular resin coil plates 7 and two annular coil piece assemblies 8. Each of the coil piece assemblies 8 is configured by arranging copper coil pieces 9 (see FIGS. 2A and 2B) as a plurality of connection conductor members at equiangular intervals on a circumference thereof.

Then, the slot coils 5 inserted in different slots 3 among the plurality of slots 3 of the stator iron core 2 are sequentially bonded by the coil pieces 9, whereby all the slot coils 5 and all the coil pieces 9 are electrically connected to form a coil.

When assembling the stator 1 having the above structure, the slot coil 5 and the coil pieces 9 are bonded together according to the following procedure.

First, in the arrangement process, as illustrated in FIG. 2A, the coil pieces 9 are arranged in contact with the bonding portions 5a and 5b on both sides in the axial direction (upward and downward in FIG. 2A) of the slot coil 5 via the metal paste 10 respectively. Specifically, the metal paste 10 is applied to a bonding portion 9a of each of the coil pieces 9. As the metal paste 10, Ag nano paste (that is, a paste composed of silver particles of the order of nanometers (nm)) is used. Thereafter, the bonding portions 9a of the coil pieces 9 are respectively brought into contact with the bonding portions 5a and 5b of the slot coil 5.

At this time, a cross-sectional area of a portion of the slot coil 5 facing a contact portion 15 is made smaller than a cross-sectional area of a portion of the slot coil 5 not facing the contact portion 15. Further, a cross-sectional area of a portion of each coil piece 9 facing the contact portion 15 is made smaller than a cross-sectional area of a portion of the coil piece 9 not facing the contact portion 15.

Subsequently, the process proceeds to the current application process, as illustrated in FIG. 2B, an electric current is applied between a pair of electrodes 11A and 11B while the contact portion 15 between the slot coil 5 and each coil piece 9 is strongly pressed by the pair of electrodes 11A and 11B in the axial direction of the slot coil 5 (upward and downward in FIG. 2B). Specifically, an alternating current supplied from an alternating current power supply 12 is transformed by a transformer 13 and then converted into a direct current by a rectifier 14. Thereafter, the electrode 11A on one side is brought into contact with an upper side of an upper coil piece 9 to apply a positive charge while the electrode 11B on the other side is brought into contact with a lower side of a lower coil piece 9 to apply a negative charge. The position where the electrodes 11A and 11B are brought into contact with the coil pieces 9 is a position axially symmetrical with respect to the contact portion 15. By doing so, balance of force can be maintained when the contact portions 15 are pressed by the pair of electrodes 11A and 11B. Therefore, it is possible to prevent, in advance, an occurrence of a situation where the electrodes 11A and 11B are oxidized at a portion where a pressure is low, causing a contact resistance and a heat generation to increase.

Then, since the current flows in the axial direction (upward and downward in FIG. 2B) of the slot coil 5 between the pair of electrodes 11A and 11B, the slot coil 5 and each coil piece 9 are tightly bonded at the contact portion 15 by a current conduction bonding.

At this time, since the electricity does not flow in the axial direction (a direction of an arrow X in FIG. 2B) of the coil piece 9, a power source capacity can be suppressed. Therefore, it is possible to provide a method for bonding electrical conductors that can suppress the power source capacity when assembling the stator 1. Moreover, it is possible to suppress a heat generation (generation of Joule heat) of the coil piece 9, and such a feature may be used as a heat sink. Therefore, it is possible to prevent, in advance, disadvantages such as melting of a resin insulating material 4 covering the slot coil 5 exceeding its heat-resistant temperature.

In addition, the slot coil 5 and each coil piece 9 are configured that a cross-sectional area of a portion of them facing the contact portion 15 is made smaller than a cross-sectional area of a portion of them not facing the contact portion 15. Therefore, in the current application process, the portion having a smaller cross-sectional area generates heat and becomes high in temperature locally. Therefore, the metal paste 10 at the contact portion 15 is liable to be melted, and the slot coil 5 and the coil pieces 9 can be effectively bonded together even though the current is small.

Further, since the metal paste 10 is Ag nano paste as described above, copper and silver are bonded by eutectic bonding in such a way that fine silver particles of Ag nano paste enter between the copper of the slot coil 5 and the copper of the coil piece 9, such that a dense and low-resistance bonding layer is formed at the contact portion 15. As a result, a reliability of bonding the slot coil 5 and the coil piece 9 can be enhanced.

Here, the bonding of the slot coil 5 and the coil piece 9 is completed.

Second Embodiment

Figure 3:
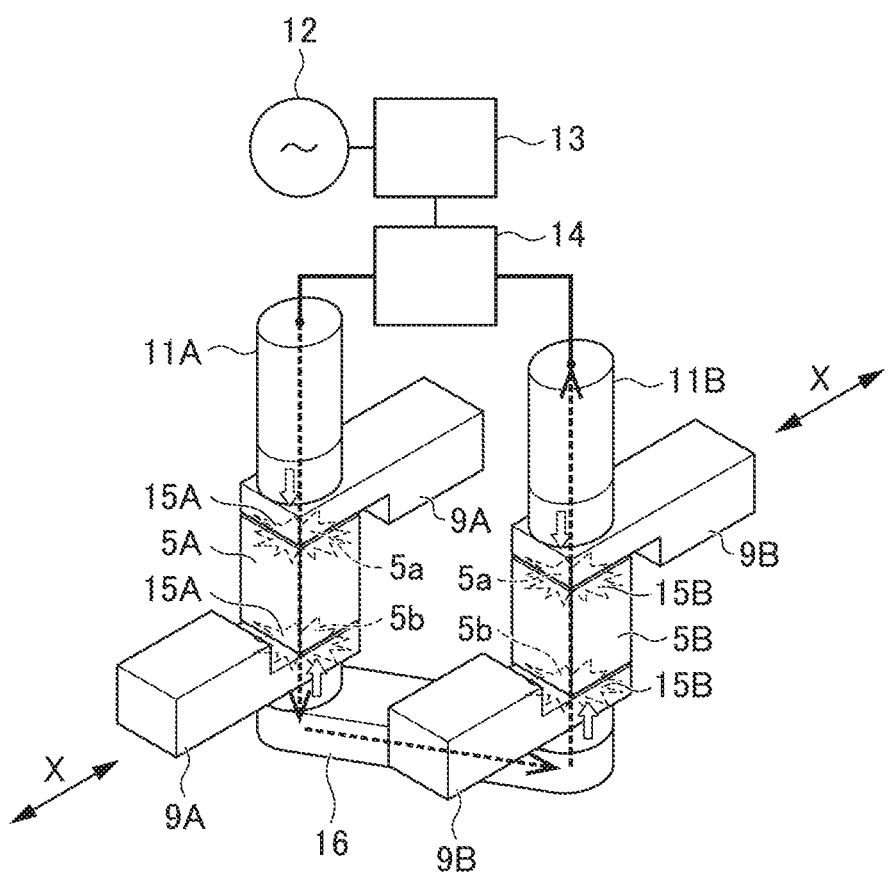
FIG. 3 is a schematic perspective view illustrating a method for bonding electrical conductors according to a second embodiment of the present invention.

FIG. 3 is a schematic perspective view illustrating a method for bonding electrical conductors according to a second embodiment of the present invention. In FIG. 3, illustration of the stator iron core is omitted.

In the second embodiment, when assembling the stator 1 according to the above-described first embodiment, the slot coil 5 and the coil piece 9 are bonded by a procedure (an arrangement process and a current application process) different from the aforementioned procedure of the first embodiment.

In other words, in the arrangement process, as illustrated in FIG. 3, a first coil piece 9A is arranged in contact with a first slot coil 5A via a metal paste 10 at a bonding portion 5a on one side (an upper side in FIG. 3) in an axial direction of the slot coil 5A, while a second coil piece 9A is arranged in contact with the first slot coil 5A via the metal paste 10 at a bonding portion 5b on the other side (a lower side in FIG. 3) in the axial direction. Subsequently, a third coil piece 9B is arranged in contact with a second slot coil 5B, which is different from the first slot coil 5A, via a metal paste 10 at a bonding portion 5a on one side (the upper side in FIG. 3) in an axial direction of the slot coil 5B, while a fourth coil piece 9B is arranged in contact with the first slot coil 5B via the metal paste 10 at a bonding portion 5b on the other side (the lower side in FIG. 3) in the axial direction. Further, the bonding portion 5b of the second coil piece 9A and the bonding portion 5b of the fourth coil piece 9B are electrically connected by the relay electrode 16.

At this time, similar to the aforementioned first embodiment, the slot coils 5A and 5B are configured such that a cross-sectional area of a portion of them facing contact portions 15A and 15B is made smaller than a cross-sectional area of a portion of them not facing the contact portions 15A and 15B. Further, with respect to each of the coil pieces 9A and 9B, a cross-sectional area of a portion of them facing the contact portions 15A and 15B is made smaller than a cross-sectional area of a portion of them not facing the contact portions 15A and 15B.

Further, in the current application process, as illustrated in FIG. 3, an electrical current is applied between a pair of electrodes 11A and 11B while the contact portions 15A between the first slot coil 5A and the first and second coil pieces 9A are pressed by the electrode 11A of the pair of electrodes 11A and 11B and the relay electrode 16 in the axial direction (upward and downward in FIG. 3) of the first slot coil 5A and the contact portions 15B between the second slot coil 5B and the third and fourth coil pieces 9B are pressed by the electrode 11B of the pair of electrodes 11A and 11B and the relay electrode 16 in the axial direction (upward and downward in FIG. 3) of the second slot coil 5B. The positions at which the electrodes 11A and 11B are brought into contact with the coil pieces 9A and 9B are axially symmetrical with respect to the contact portions 15A and 15B. By doing so, balance of force can be maintained when the contact portions 15A and 15B are pressed by the pair of electrodes 11A and 11B and the relay electrode 16. Therefore, it is possible to prevent, in advance, an occurrence of a situation where the electrodes 11A and 11B are oxidized at a portion where a pressure is low, causing a contact resistance and a heat generation to increase.

Then, since the current flows in the axial direction of the slot coils 5A and 5B (upward and downward in FIG. 3) between the pair of electrodes 11A and 11B via the relay electrode 16, the slot coils 5A and 5B and the coil pieces 9A and 9B are firmly joined respectively at the contact portions 15A and 15B by the current conduction bonding.

At this time, since the electricity does not flow in the axial direction (a direction of an arrow X in FIG. 3) of the coil pieces 9A and 9B, a power source capacity can be suppressed. Therefore, it is possible to provide a method for bonding electrical conductors that can suppress the power source capacity when assembling the stator 1. Moreover, it is possible to suppress a heat generation (generation of Joule heat) of the coil pieces 9A and 9B, and such a feature may be used as a heat sink. Therefore, it is possible to prevent, in advance, disadvantages such as melting of a resin insulating material 4 covering the slot coils 5A and 5B exceeding its heat-resistant temperature.

In addition, the slot coils 5A and 5B and each coil pieces 9A and 9B are configured that a cross-sectional area of each of portions of them facing the contact portions 15A and 15B is made smaller than a cross-sectional area of each of portions of them not facing the contact portions 15A and 15B. Therefore, in the current application process, the portion having a smaller cross-sectional area generates heat and becomes high in temperature locally. Therefore, the metal pastes 10 at the contact portions 15A and 15B are liable to be melted, and the slot coils 5A and 5B and the coil pieces 9A and 9B can be effectively bonded together even though the current is small.

Further, since the metal paste 10 is Ag nano paste as in the first embodiment described above, copper and silver are bonded by eutectic bonding in such a way that fine silver particles of Ag nano paste enter between the copper of the slot coils 5A and 5B and the copper of the coil pieces 9A and 9B, such that a dense and low-resistance bonding layer is formed at the contact portions 15A and 15B. As a result, a reliability of bonding the slot coils 5A and 5B and the coil pieces 9A and 9B can be enhanced.

Here, the bonding of the slot coils 5A and 5B and the coil pieces 9A and 9B is completed.

Other Embodiments

Although the embodiments of the present invention have been described above, the present invention is not limited to the above-described embodiments. In addition, the effects described in the embodiments merely list the most preferable effects produced by the present invention, and the effects of the present invention are not limited to those described in the embodiments.

For example, in the above-described first embodiment, as illustrated in FIG. 2B, the case where the current conduction bonding is performed for each of the slot coils 5 by alternating current power supply 12 was described. However, it is possible to continuously execute the current conduction bonding of the two slot coils 5 with the use of one alternating current power supply 12 by configuring the circuit so that the current conduction from the alternating current power supply 12 can be performed by switching the two slot coils 5.

Further, in the first embodiment and the second embodiment described above, the stator 1 including the linear (I-shaped) slot coil 5 has been described. However, the shape of the slot coil 5 is not limited to be I-shaped but may be L-shaped, for example.

Further, in the first embodiment and the second embodiment described above, the case where the Ag nano paste is used as the metal paste 10 in the arrangement process has been described. However, material (for example, plating material, brazing material and the like) other than the Ag nano paste can be used instead of or in combination with the Ag nano paste.

Further, in the first embodiment and the second embodiment described above, the stator 1 of the motor has been described. However, the present invention is not limited to the embodiment, and the present invention can be similarly applied to, for example, a stator of a generator.

EXPLANATION OF REFERENCE NUMERALS

1: stator
2: stator iron core
3: slot
5: conductor member (slot coil)
5a, 5b: bonding portion
9: connection conductor member (coil piece)
9a: bonding portion
10: metal paste
11a, 11b: electrode
15: contact portion
16: relay electrode

What is claimed is:

1. A method for bonding electrical conductors that bonds conductor members and connection conductor members in a stator where a plurality of slots are formed in an annular stator iron core along a circumferential direction thereof, linear conductor members are inserted into the slots respectively such that bonding portions of each of the conductor members on both sides in an axial direction thereof protrude from the slot, and the conductor members inserted in different slots of the plurality of slots are sequentially bonded with the connection conductor members so that the conductor members and the connection conductor members are electrically connected to each other to form a coil, the method comprising:
   an arrangement process of arranging the connection conductor members in contact with the bonding portions of the conductor members via a metal paste; and
   a current application process of applying an electrical current in the axial direction of the conductor members with use of a pair of electrodes while pressing contact portions between the conductor members and the connection conductor members in the axial direction of the conductor members,
   wherein, in the arrangement process, the connection conductor members are placed in contact with the bonding portions on both sides in the axial direction of the conductor members via the metal paste, respectively, and
   wherein, in the current application process, the electrical current is applied between the pair of electrodes in the axial direction of the conductor members while the contact portions between the conductor members and the connection conductor members are pressed by the electrodes in the axial direction of the conductor members.

2. A method for bonding electrical conductors that bonds conductor members and connection conductor members in a stator where a plurality of slots are formed in an annular stator iron core along a circumferential direction thereof, linear conductor members are inserted into the slots respectively such that bonding portions of each of the conductor members on both sides in an axial direction thereof protrude from the slot, and the conductor members inserted in different slots of the plurality of slots are sequentially bonded with the connection conductor members so that the conductor members and the connection conductor members are electrically connected to each other to form a coil, the method comprising:
   an arrangement process of arranging the connection conductor members in contact with the bonding portions of the conductor members via a metal paste; and
   a current application process of applying an electrical current in the axial direction of the conductor members with use of a pair of electrodes while pressing contact portions between the conductor members and the connection conductor members in the axial direction of the conductor members,
   wherein, in the arrangement process:
   a first connection conductor member is arranged in contact with an arbitrary first conductor member of the conductor members via the metal paste at a bonding portion of the first conductor member on one side in an axial direction thereof while arranging a second connection conductor member in contact with the first conductor member via the metal paste at a bonding portion of the first conductor member on an other side in the axial direction thereof;
   a third connection conductor member is arranged in contact with an arbitrary second conductor member, which is different from the first conductor member, of the conductor members via the metal paste at a bonding portion of the second conductor member on one side in an axial direction thereof while arranging a fourth connection conductor member in contact with the second conductor member via the metal paste at a bonding portion of the second conductor member on an other side in the axial direction thereof; and
   the bonding portion of the second connection conductor member and the bonding portion of the fourth connection conductor member is electrically connected to each other via a relay electrode, and
   wherein, in the current application process,
   the electrical current is applied between the pair of electrodes while contact portions between the first conductor member and the first connection conductor member and the second connection conductor member are pressed by one of the pair of electrodes and the relay electrode in the axial direction of the first conductor member, and
   contact portions between the second conductor member and the third connection conductor member and the fourth connection conductor member are pressed by the other of the pair of electrodes and the relay electrode in the axial direction of the second conductor member.

3. A method for bonding electrical conductors that bonds conductor members and connection conductor members in a stator where a plurality of slots are formed in an annular stator iron core along a circumferential direction thereof, linear conductor members are inserted into the slots respectively such that bonding portions of each of the conductor members on both sides in an axial direction thereof protrude from the slot, and the conductor members inserted in different slots of the plurality of slots are sequentially bonded with the connection conductor members so that the conductor members and the connection conductor members are electrically connected to each other to form a coil, the method comprising:

an arrangement process of arranging the connection conductor members in contact with the bonding portions of the conductor members via a metal paste; and a current application process of applying an electrical current in the axial direction of the conductor members with use of a pair of electrodes while pressing contact portions between the conductor members and the connection conductor members in the axial direction of the conductor members, wherein a cross-sectional area of a portion of the conductor members facing the contact portion is smaller than a cross-sectional area of a portion of the conductor members not facing the contact portion.

4. A method for bonding electrical conductors that bonds conductor members and connection conductor members in a stator where a plurality of slots are formed in an annular stator iron core along a circumferential direction thereof, linear conductor members are inserted into the slots respectively such that bonding portions of each of the conductor members on both sides in an axial direction thereof protrude from the slot, and the conductor members inserted in different slots of the plurality of slots are sequentially bonded with the connection conductor members so that the conductor members and the connection conductor members are electrically connected to each other to form a coil, the method comprising:

an arrangement process of arranging the connection conductor members in contact with the bonding portions of the conductor members via a metal paste; and a current application process of applying an electrical current in the axial direction of the conductor members with use of a pair of electrodes while pressing contact portions between the conductor members and the connection conductor members in the axial direction of the conductor members, wherein a cross-sectional area of a portion of the connection conductor members facing the contact portion is smaller than a cross-sectional area of a portion of the connection conductor members not facing the contact portion.

5. A method for bonding electrical conductors that bonds conductor members and connection conductor members in a stator where a plurality of slots are formed in an annular stator iron core along a circumferential direction thereof, linear conductor members are inserted into the slots respectively such that bonding portions of each of the conductor members on both sides in an axial direction thereof protrude from the slot, and the conductor members inserted in different slots of the plurality of slots are sequentially bonded with the connection conductor members so that the conductor members and the connection conductor members are electrically connected to each other to form a coil, the method comprising:

an arrangement process of arranging the connection conductor members in contact with the bonding portions of the conductor members via a metal paste; and a current application process of applying an electrical current in the axial direction of the conductor members with use of a pair of electrodes while pressing contact portions between the conductor members and the connection conductor members in the axial direction of the conductor members, wherein the metal paste is Ag nano paste.

\* \* \* \* \*